United States Patent Office 3,839,572
Patented Oct. 1, 1974

3,839,572
5-NITRO-2-THIOCARBAMYL THIAZOLE AS A FUNGICIDE

John Pomfret Verge, Henley-on-Thames, and Peter Graham Hughes, Sunningdale, England, assignors to Lilly Industries Limited, London, England
No Drawing. Original application Mar. 29, 1971, Ser. No. 129,238, now Patent No. 3,736,329. Divided and this application Sept. 5, 1972, Ser. No. 286,391
Int. Cl. A01n 9/12
U.S. Cl. 424—270      3 Claims

ABSTRACT OF THE DISCLOSURE

5-Nitro-2-thiocarbamyl thiazole prepared by reaction of 5-nitro-2-cyanothiazole and thioacetamide is useful as a plant fungicide.

SPECIFICATION

This is a division of application Ser. No. 129,238, filed Mar. 29, 1971 now U.S. Pat. 3,736,329.

This invention is concerned with the provision of a new, broad spectrum plant fungicide and its use in protecting economically important plant life from fungal attack.

The novel fungicide provided by the present invention is 5-nitro-2-thiocarbamyl thiazole of structure:

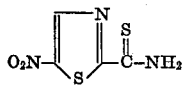

I which may be prepared by reaction of the known compound 5-nitro-2-cyanothiazole with trioacetamide, the reaction preferably being carried out in a molten dimethyl formamide-hydrogen chloride complex at temperatures of from about 40 to 60° C. The product may be isolated from the reaction mixture by stirring the mixture in ice-water and collecting the resultant precipitate, for example by filtration.

The compound of formula I has been found by in vitro and in vivo test procedures to possess useful activity against a wide spectrum of plant pathogenic fungi including Alternaria tenuis (leaf spot of onions), Botrytis cinerea (grey mould of grapes), Colletotrichum atramentarium (potato anthracnose), Colletotrichum lagenarium (cucumber anthracnose), Helminthosporium sativum (leaf spot of barley), Penicillium expansum (soft rot of fruit), Peronospora sp. (downey mildews of fruits and plants) particularly Plasmopora viticola (vine downey mildew), Phytophthora infestans (tomato late blight), Piricularia oryzae (rice blast) and Venturia inaequalis (apple scab). The results from the above-mentioned tests, and the method by which the tests were carried out, are as given below.

The activity of the compound of formula I against various pathogenic fungi was assessed in vitro using the gradient plate technique. The fungi used and the results obtained—expressed in terms of the minimum inhibitory concentration (M.I.C.)—are given in Table I below:

TABLE I

| Fungus | M.I.C. in µg./ml. |
|---|---|
| Alternaria tenuis | 2 |
| Botrytis cinerea | 2 |
| Colletotrichum atramentarium | 8 |
| Penicillium expansum | 4 |

Table II which follows contains the test results obtained from the compound of formula I in standard fungicide tests. As shown, the compound of the invention displays fungicidal activity against the diseases tomato late blight, rice blast, anthracnose of cucumber, Helminthosporum leaf spot of barley, apple scab and grey mould of grapes.

The results shown are obtained in tests carried out as described in the following paragraphs. In each test the compound was formulated as an emulsion or solution at a concentration of 400 p.p.m. (except for apple scab where the dosage was 100 p.p.m. and Botrytis cinerea where the dosage was 800 p.p.m.) and applied as a spray.

Rice blast. The aqueous emulsion of the test compound was applied to all leaf surfaces of 14-day-old rice plants of the NATO variety and allowed to dry. The foliage was then inoculated with a water suspension of conidia Piricularia oryzae race N-1) by means of a sprayer. The treated plants were placed in a moist chamber at 65° F. for 40 hours before being returned to the greenhouse. Eight days thereafter, the symptoms of the blast disease were observed and compared with control plants.

Cucumber Anthracnose. The aqueous emulsion of the test compound was sprayed on all leaf surfaces of 15-year-old cucumber plants (Green Prolific variety) and allowed to dry. The foliage was then inoculated with a water suspension of conidia (Collectotrichum lagenarium) by means of a sprayer.

Following inoculation, the treated plants were placed in a moist chamber maintained at 75° F. for 40 hours after which the plants were returned to the greenhouse. On the 10th day following treatment and inoculation the disease symptoms were observed and recorded and compared with control plants.

Tomato Late Blight. The aqueous emulsion of the test compound was sprayed on all leaf surfaces of 28-day-old tomato plants of the Bonnie Best variety and allowed to dry. The plants were then inoculated with a water suspension of fungal propagules (Phytophthora infestans) by means of a sprayer. The plants were placed in a moist chamber maintained at a temperature of 65° F. for 24 hours after which they were returned to the greenhouse. Three days thereafter, the symptoms of late blight disease were observed and recorded and compared with control plants.

Helminthosporum Leaf Spot of Barley. The aqueous emulsion of the test compound was sprayed on 6-day-old barley seedlings 4–5 inches tall of the Larker variety and allowed to dry. The plants were then inoculated with an aqueous suspension of spores of Helminthosporum sativum and placed in a moist chamber at 65° F. for 48 hours. Two days later the plants were removed from the chamber and placed in the greenhouse. Four days thereafter, or 12 days from planting, the symptoms of leaf spot disease were observed and recorded and the results were compared with control plants.

Apple Scab. A 0.67% solution of the test compound in cyclohexanone was sprayed on five-leaf stage McIntosh apple seedlings and allowed to dry. The plants were then inoculated with a water suspension of conidia (Venturia inaequalis) by means of a sprayer. After inoculation, the treated plants were placed in a moist chamber at 65° F. for 48 hours after which the plants were returned to the greenhouse. Seven to 10 days thereafter, the symptoms of apple scab were observed and compared with control plants.

Grey Mould of Grapes. Grape clusters (four berries per cluster) of Red Emperor grapes were sterilised with a 1.5% solution of sodium hypochlorite, rinsed with distilled water and allowed to dry. The clusters were then burnt out in alcohol to ensure complete sterilisation and to predispose the berries to infection. The test compound was then applied by spray as a 1% solution in acetone/ethanol and the berries dried. A spore suspension of Botrytis cinerea was then applied evenly over the clusters and, after 48 hours incubation at 75° F., the disease symptoms were noted and compared with controls.

TABLE II

| Disease | Dosage, p.p.m. | Activity rating [a] |
|---|---|---|
| Rice blast | 400 | 3 |
| Cucumber anthracnose | 400 | 4 |
| Tomato late blight | 400 | 3 |
| Barley leaf spot | 400 | 3 |
| Apple scab | 100 | 5 |
| Botrytis cinerea | 800 | 5 |

[a] Activity rating was 1=no control; 2=slight control; 3=moderate control; 4=good control; 5=complete control.

The fungicidally active compound of formula I can be employed to protect plants susceptible to pathogenic fungi, thereby preventing the onset of disease symptoms, and can also be used to treat infected plants. Accordingly the present invention also provides a method of treating plants susceptible to attack by fungi comprising applying to said plant a fungicidal amount of compound of formula I. In carrying out the method of the present invention, the compound may be applied to the foliage of plants and/or to the soil or water in which the plants are growing.

The compound of the present invention will normally be used in the form of compositions comprising the active ingredient in association with a suitable diluent or carrier material such as one or more of water, alcohols, glycols, glycol ethers, petroleum distillates and various dispersion media such as surfactants, emulsifiers and finely divided inert solids. The concentration of the active ingredient in these compositions will vary depending on whether the composition is to be used directly as a dust or is intended as an emulsifiable concentrate or wettable powder designed to be subsequently diluted for example with water prior to use.

Since in use the compound will normally be applied to infected or susceptible plants in compositions containing from about 2 to 2000 p.p.m., preferably from about 50 to 1000 p.p.m., of the active ingredient, it is normally convenient for ease of formulation, storage, package, etc., to formulate the active ingredient as a liquid or solid concentrate composition.

Liquid concentrates may be prepared by dissolving, dispersing or suspending from 0.1 to 25% by weight of the active ingredient in water or a suitable water-miscible solvent such as, for example, suitable aromatic, aliphatic or cyclo-aliphatic hydrocarbons, ketones or alcohols to which may be added an emulsifying agent, for example a nonionic or ionic type or blend such as condensation products of alkylene oxides with phenols and organic acids, polyoxyethylene derivatives of sorbitan esters, complex ether-alcohols and the like.

Solid concentrate mixtures may be prepared by incorporating from 5 to 50% by weight of the active ingredient in a finely divided solid carrier such as bentonite, fuller's earth, diatomaceous earth, hydrated silica, diatomaceous silica, kaolin, expanded mica, attapulgite, talc, chalk and the like. Such concentrates may be formulated for direct use or may, if desired, be diluted with additional inert solid carriers to produce dusting powders. Alternatively dispersing and/or wetting agents may be incorporated to form wettable powder concentrates which subsequently may be dispersed in water or in other aqueous carriers to form spray compositions. Suitable wetting and emulsifying agents include sodium lauryl sulphate, sodium lignosulphate and other suitable nonionic and anionic surfactants or blends thereof.

The active ingredient of the invention may also be incorporated in tablets, pellets, capsules or formulated as aerosols or sprays to ensure that the fungicidal action can be obtained at the locus of the disease.

The following Example will illustrate the preparation of the compound employed in this invention:

EXAMPLE

5-Nitro-2-cyano thiazole (7.75 g., 0.05 mole) was dissolved in molten dimethyl formamide-hydrogen chloride 1:1 complex (40 ml.) at a temperature of 45° C. Thioacetamide (4.66 g., 0.06 mole) was added to the stirred solution and the exothermic reaction controlled by keeping temperature in the range 45–50° C., by means of a cold water bath. The reaction was complete in 25 minutes as shown by thin-layer chromatography. The red mixture was poured into ice-water (400 ml.) and stirred for 1 hour, the orange precipitate collected, washed with water and dried to yield 5-nitro-2-thiocarbamyl thiazole (8.8 g.).

A small sample recrystallised from chloroform-ether mixture had a m.p. of 204–207° C. and analysed as follows:

Found: C, 25.5; H, 1.52; N, 22.20. $C_4H_3N_3O_2S_2$ requires: C, 25.40; H, 1.60; N, 22.21%.

We claim:

1. A fungicidal composition comprising as the active ingredient a fungicidally effective amount of the compound of the formula

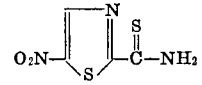

and an inert carrier.

2. A method of treating plants susceptible to attack by pathogenic fungi comprising applying to said plants a fungicidally effective amount of the composition of claim 1.

3. The method according to claim 2, wherein the fungicidal composition comprises from 2 to 2,000 parts per million of said compound.

References Cited

UNITED STATES PATENTS 3,677,777 7/1972 Ishii et al. _____ 424—270

VINCENT O. TURNER, Primary Examiner